United States Patent
Terrien et al.

(10) Patent No.: US 8,535,638 B2
(45) Date of Patent: Sep. 17, 2013

(54) PROCESS FOR RECOVERING HYDROGEN AND CARBON DIOXIDE

(75) Inventors: Paul Terrien, Philadelphia, PA (US); Trapti Chaubey, Wilmington, DE (US); Purushottam V. Shanbhag, Claymont, DE (US); Bhadra S. Grover, Sugar Land, TX (US); Dennis A. Vauk, Houston, TX (US); Arthur Darde, Paris (FR)

(73) Assignees: Air Liquide Large Industries U.S., Houston, TX (US); L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 130 days.

(21) Appl. No.: 12/974,183

(22) Filed: Dec. 21, 2010

(65) Prior Publication Data
US 2012/0121497 A1   May 17, 2012

Related U.S. Application Data

(60) Provisional application No. 61/412,657, filed on Nov. 11, 2010.

(51) Int. Cl.
*C01B 3/24* (2006.01)
*C01B 3/38* (2006.01)

(52) U.S. Cl.
USPC ............................... 423/650; 252/373

(58) Field of Classification Search
None
See application file for complete search history.

(56) References Cited

U.S. PATENT DOCUMENTS

| | | | |
|---|---|---|---|
| 4,553,981 A | 11/1985 | Fuderer | |
| 4,639,257 A | 1/1987 | Duckett et al. | |
| 4,836,833 A | 6/1989 | Nicholas et al. | |
| 5,082,481 A | 1/1992 | Barchas et al. | |
| 6,301,927 B1 | 10/2001 | Reddy | |
| 6,322,611 B1 | 11/2001 | Engler | |
| 6,500,241 B2 | 12/2002 | Reddy | |
| 7,018,445 B2 | 3/2006 | Simmons et al. | |
| 7,025,804 B2 | 4/2006 | Simmons et al. | |
| 7,682,597 B2 | 3/2010 | Blumenfeld et al. | |
| 2009/0064582 A1 | 3/2009 | Malhotra et al. | |
| 2009/0117024 A1 | 5/2009 | Weedon et al. | |
| 2009/0298957 A1 | 12/2009 | Gauthier et al. | |
| 2010/0047160 A1 | 2/2010 | Allam | |
| 2010/0126180 A1 | 5/2010 | Forsyth et al. | |
| 2010/0129284 A1 | 5/2010 | Niitsuma et al. | |
| 2010/0287981 A1 | 11/2010 | Chen et al. | |
| 2011/0223100 A1 | 9/2011 | Monereau et al. | |
| 2012/0118011 A1 | 5/2012 | Terrien et al. | |
| 2012/0121497 A1 | 5/2012 | Terrien et al. | |

FOREIGN PATENT DOCUMENTS

| | | |
|---|---|---|
| EP | 0410845 | 1/1991 |
| EP | 2023067 | 2/2009 |
| FR | 2781390 | 1/2000 |

(Continued)

OTHER PUBLICATIONS

PCT/US2011/060154, International Search Report and Written Opinion, Feb. 1, 2012.

(Continued)

*Primary Examiner* — Melvin C Mayes
*Assistant Examiner* — Kenneth Vaden

(57) ABSTRACT

The present invention provides a process for recovering hydrogen and carbon dioxide from a process stream of a process unit wherein the process stream contains at least carbon dioxide, hydrogen, and methane.

38 Claims, 5 Drawing Sheets

(56) References Cited

FOREIGN PATENT DOCUMENTS

Figure 1:
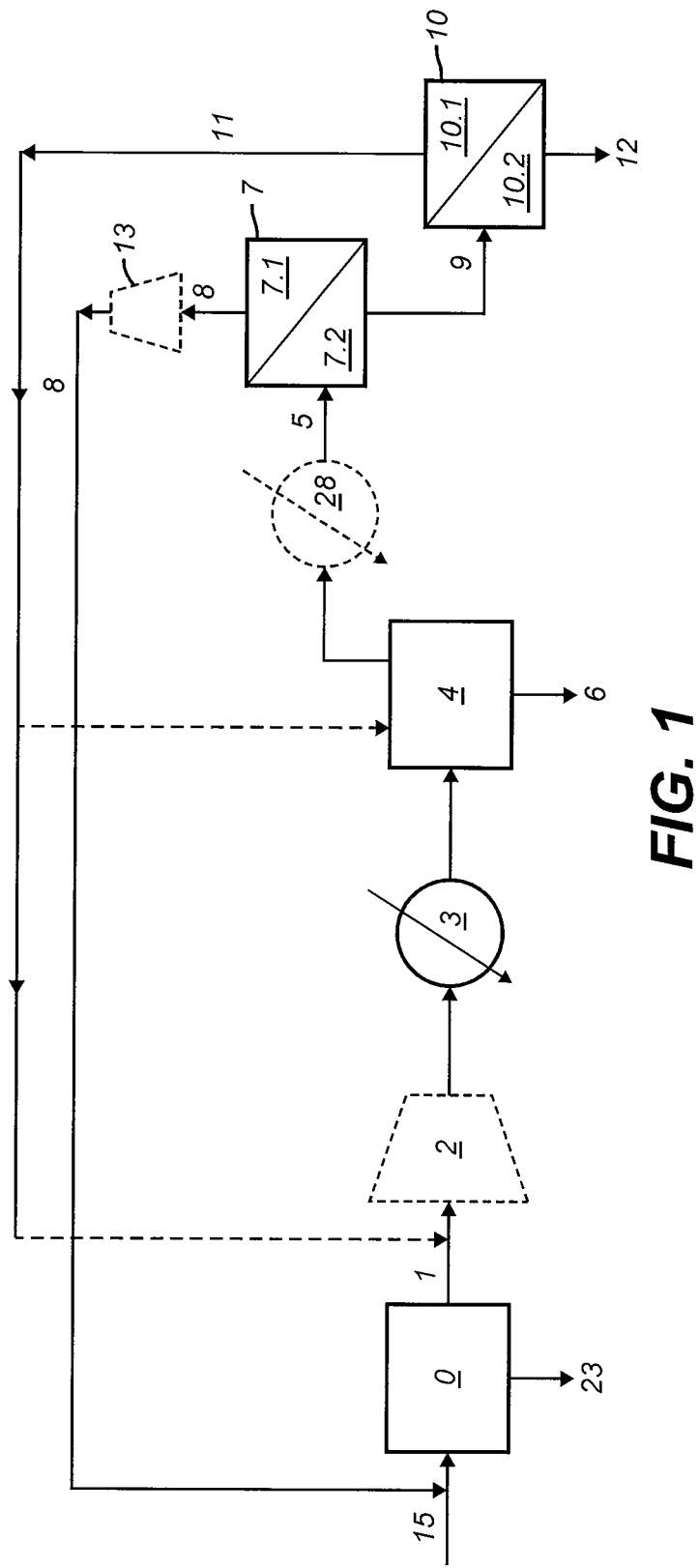

| | | |
|---|---|---|
| FR | 2877939 | 5/2006 |
| FR | 2939785 | 6/2010 |
| JP | 2008247636 | 10/2008 |
| WO | WO2004089499 | 10/2004 |
| WO | WO2010112502 | 10/2010 |

OTHER PUBLICATIONS

PCT/US2011/060161, International Search Report and Written Opinion, Feb. 1, 2012.

PCT/US2012/037917, International Search Report and Written Opinion, Aug. 22, 2012.

PCT/US2012/037923, International Search Report and Written Opinion, Aug. 21, 2012.

PCT/US2012/037902, International Search Report and Written Opinion, Sep. 24, 2012.

PCT/US2012/037912, International Search Report and Written Opinion, Sep. 25, 2012.

PCT/US2012/037889, International Search Report and Written Opinion, Sep. 24, 2012.

PCT/US2012/037898, International Search Report and Written Opinion, Sep. 25, 2012.

PROCESS FOR RECOVERING HYDROGEN AND CARBON DIOXIDE

CROSS-REFERENCE TO RELATED APPLICATIONS

This application claims the benefit of U.S. Provisional Application No. 61/412,657, filed Nov. 11, 2010, the entire contents of which are incorporated herein by reference.

FIELD OF THE INVENTION

The present invention relates to a process for recovering hydrogen and carbon dioxide from a process stream utilizing a carbon dioxide separation unit and two membrane separation units. The present invention further relates to a process for producing hydrogen from a hydrocarbon containing feed gas and capturing at least 90% of the carbon dioxide present in the syngas of a hydrogen generation plant utilizing a carbon dioxide separation unit and two membrane separation units.

BACKGROUND

Hydrogen is an important feedstock for many chemical and petrochemical processes. However, hydrogen production is associated with large amounts of carbon dioxide ($CO_2$) emissions. Accordingly, it is desirable to not only provide a means to produce hydrogen but also a means to recover the carbon dioxide associated with the hydrogen production. With increased emission regulations and a possible future $CO_2$ tax there is a need to develop carbon dioxide capture solutions. The cost of capture can impact the cost of hydrogen production. Therefore, it is important to develop a solution with lower cost of capture and improved efficiency of hydrogen production plant.

Physical or chemical solvents such as rectisol, selexol, amines, potassium carbonate etc. have been used traditionally for many decades to absorb carbon dioxide from syngas in hydrogen plants, HYCO (hydrogen and carbon monoxide co-production) plants. However, the process of solvent absorption requires absorber and stripper columns with very high capital costs. The scrubbing solvent needs to be regenerated by temperature swing or pressure swing in order to release the absorbed carbon dioxide. The regeneration process can involve large amounts of steam or compression energy resulting in high operating costs. Another disadvantage of using the solvent absorber is that the purity of the recovered carbon dioxide may not be very high and further processing using liquefaction and partial condensation may be needed. Example U.S. Pat. No. 6,500,241 describes the use of acid gas removal unit and auto refrigeration unit for removing carbon dioxide from syngas and PSA off-gas. U.S. Pat. Nos. 4,553,981 and 7,682,597 describe the use of a carbon dioxide scrubber downstream of the shift reactor to remove carbon dioxide from syngas.

Carbon dioxide can be captured from a hydrogen plant by using cryogenic processing viz, partial liquefaction or distillation at low temperatures. Such a process is favorable at higher carbon dioxide concentrations. In hydrogen plants, carbon dioxide can be captured from several different locations in the process train including process syngas or flue gas. Flue gas processing can pose several challenges because of many new impurities that therefore make the capture process very expensive. Carbon dioxide from process gas can be captured from high pressure syngas before pressure swing adsorption unit or from pressure swing adsorption off-gas. The concentration of carbon dioxide in the gas before pressure swing adsorption is much lower than in the pressure swing adsorption off-gas and hence the pressure swing adsorption off-gas is more suitable for cryogenic separation. U.S. Pat. No. 6,301,927 provides an example of an auto refrigeration process that employs the use of a compression and expansion turbine to liquefy carbon dioxide and further separate it from other gases. Another patent, FR Patent No. 2877939 provides a way to remove carbon dioxide from pressure swing adsorption off-gas by using successive steps of compression and cooling to remove carbon dioxide by partial liquefaction and/or distillation. This patent describes the use of a membrane on the non-condensable gas to permeate hydrogen and recycle hydrogen back to the pressure swing adsorption unit in order to increase hydrogen recovery. However, carbon dioxide recovery for the unit is not very high. In U.S. Pat. No. 4,639,257, provides the use of carbon dioxide selective membrane in combination with distillation column for a carbon dioxide containing gas mixture in order to increase the recovery of carbon dioxide. A carbon dioxide selective membrane is used on the overhead of the distillation column with carbon dioxide rich permeate recycled back to feed or to the distillation column itself. Another carbon dioxide selective membrane is proposed for the feed gas before the distillation column in case the concentration of carbon dioxide is below equilibrium concentration at the freezing temperature of the mixture. However, this patent is suitable for a gas mixture containing carbon dioxide, nitrogen, methane and hydrocarbon. U.S. Patent Publication No. 2010/0129284, describes the use of a hydrogen selective membrane, a carbon dioxide selective membrane in combination with carbon dioxide liquefier in order to increase the recovery of hydrogen and carbon dioxide. However, carbon dioxide selective membrane is always located upstream of the liquefier requiring additional compression of the carbon dioxide permeate from the membrane feeding to the liquefier.

Hydrogen plants can emit large quantities of carbon dioxide into the atmosphere. Carbon dioxide capture solutions have been proposed in the past using several different separation techniques like absorption, cryogenic, adsorption or membrane. There is always some hydrogen loss from pressure swing adsorption processes. In addition, there is some carbon dioxide loss from the capture process which can be recovered by improving the carbon dioxide capture process. If additional hydrogen and carbon dioxide can be recovered from the capture process there can be significant savings with regards to the size of reformer, natural gas consumption, carbon dioxide tax etc. for the same size hydrogen plant.

Accordingly, there still exists a need for a process to recover both hydrogen and carbon dioxide with a carbon dioxide recovery rate of at least 90% from syngas, as well as a process for producing hydrogen in a hydrogen generation plant that allows for the overall capture of at least 50% of the carbon dioxide, preferably at least 90% of the carbon dioxide, in the hydrogen production process.

SUMMARY

This present invention provides a method to more efficiently recover hydrogen and carbon dioxide. The present invention further provides the design for carbon dioxide capture from syngas that allows for the simultaneous production of medium to high amounts of hydrogen and the capture of at least 90% of the carbon dioxide in the syngas as a part of the production of hydrogen in a hydrogen generation plant. It is proposed to use combinations of hydrogen selective membranes and carbon dioxide selective membranes together with a carbon dioxide separation unit such that hydrogen and carbon dioxide are produced with increased recoveries and improved process efficiency of the hydrogen generation plant. Increased hydrogen recovery by using hydrogen selective membranes can reduce the size of the reformer, natural gas consumption for feed and fuel etc for the same size hydrogen plant. Increased carbon dioxide recovery will reduce the emissions of carbon dioxide into the atmosphere and will result in cost savings in case of a carbon tax.

DETAILED DESCRIPTION OF THE DRAWINGS

FIG. 1 provides a schematic of one embodiment of the present process.

Figure 2:
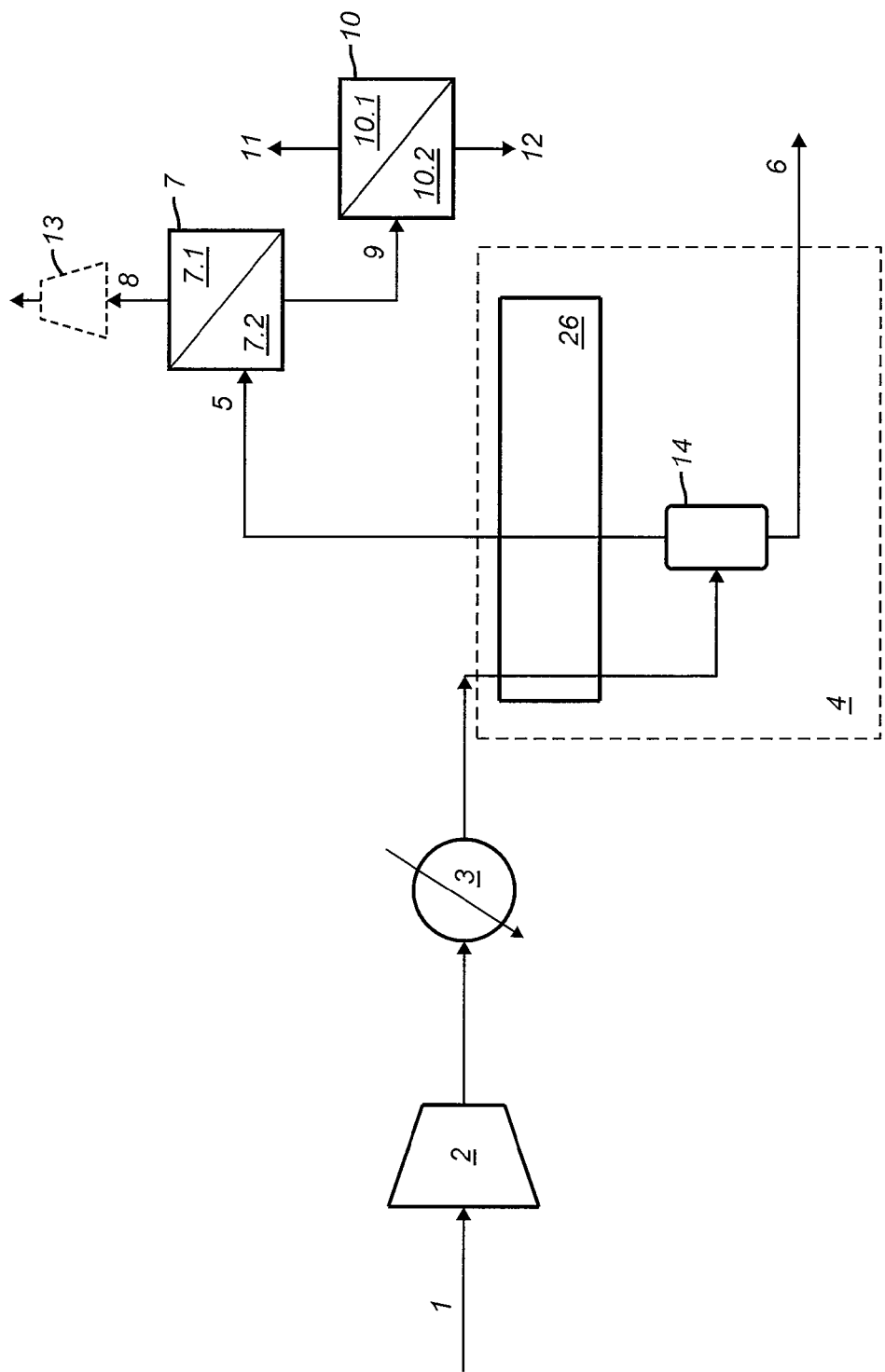

FIG. 2 provides an expanded view of one variation of the carbon dioxide separation unit of FIG. 1.

Figure 3:
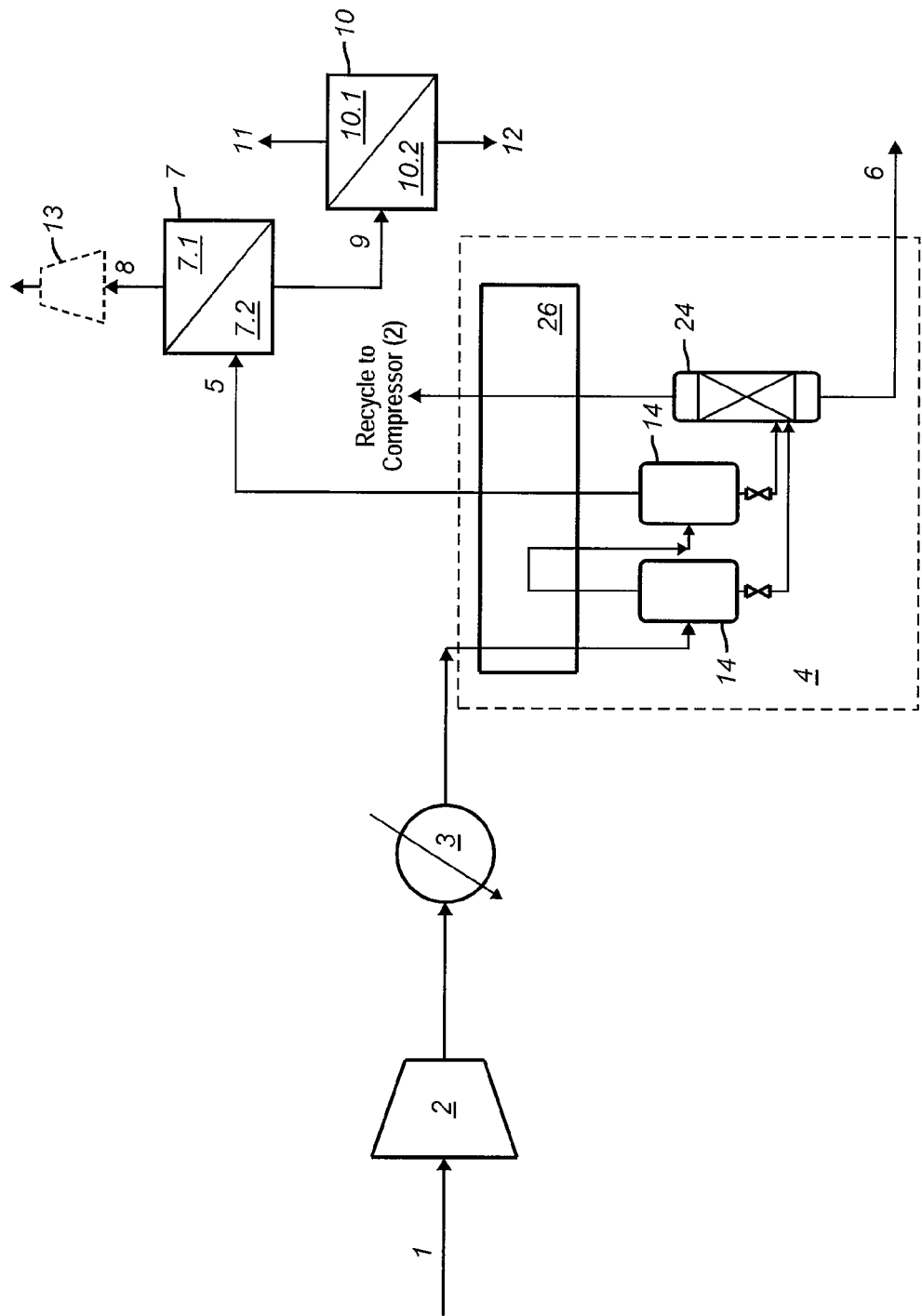

FIG. 3 provides an expanded view of another variation of the carbon dioxide separation unit of FIG. 1.

Figure 4:
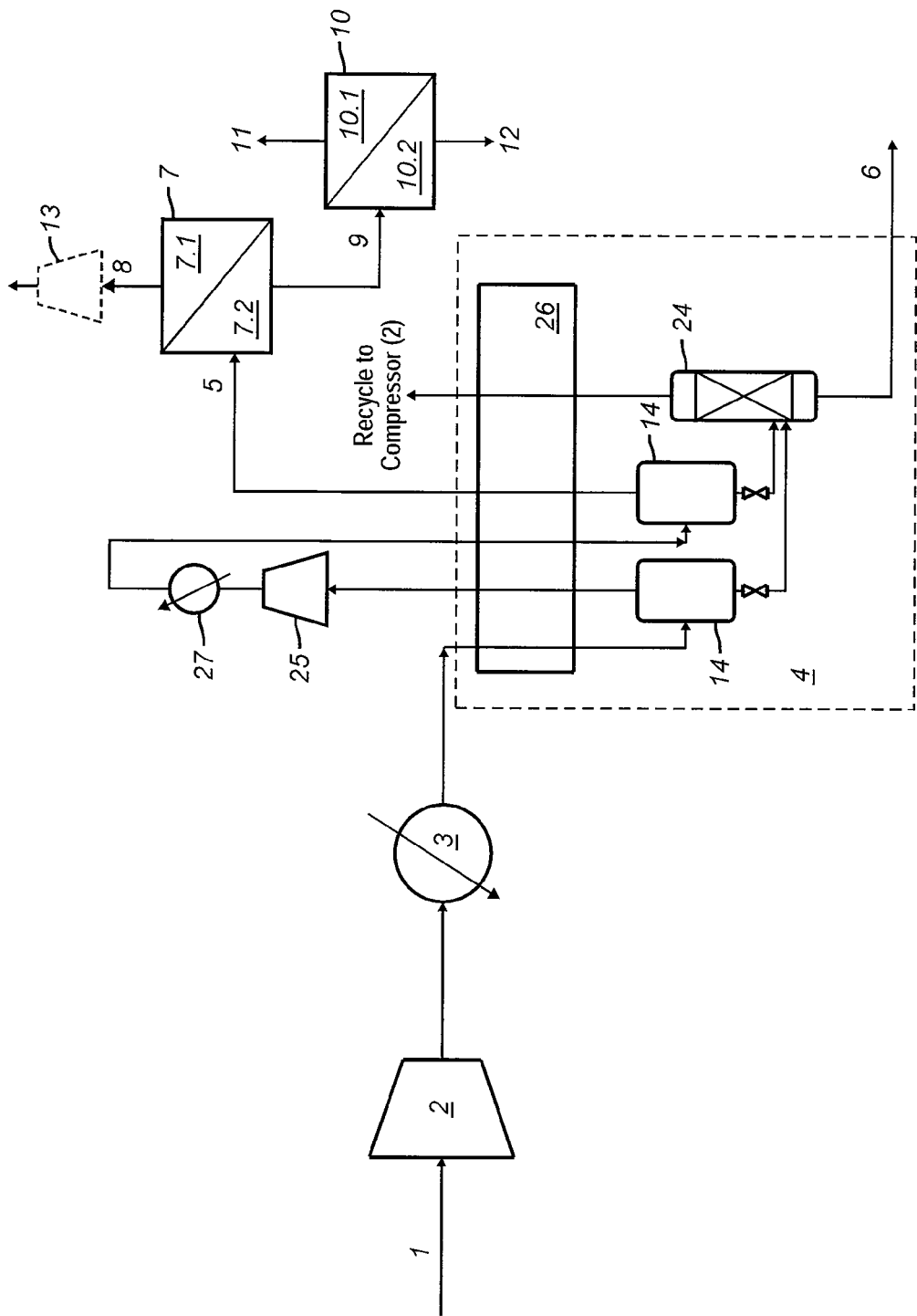

FIG. 4 provides an expanded view of still a further variation of the carbon dioxide separation unit of FIG. 1.

Figure 5:
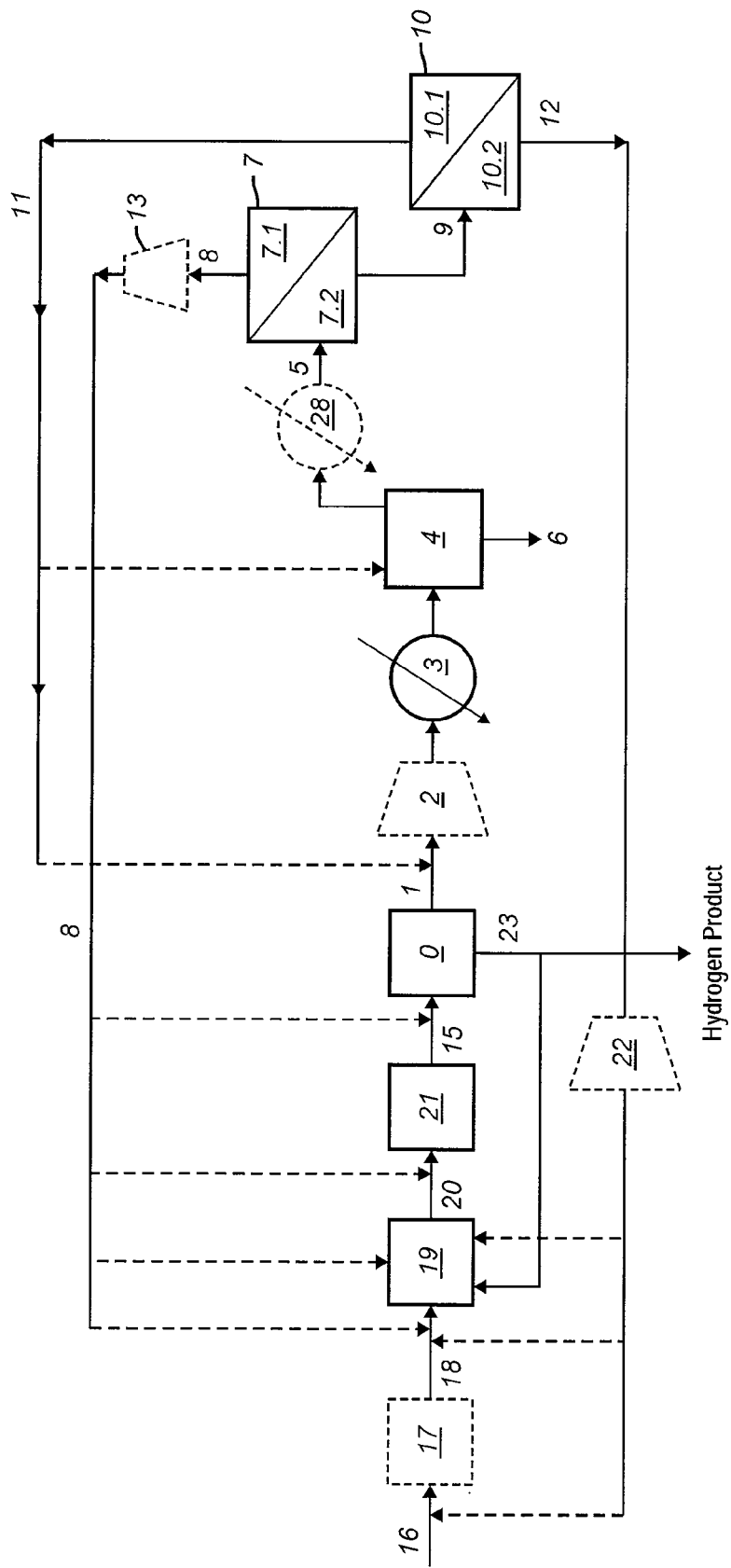

FIG. 5 provides a schematic of a second embodiment of the present process.

DETAILED DESCRIPTION OF THE INVENTION

It is possible to efficiently recover hydrogen and carbon dioxide from process streams obtained from process units which have a purification step that provides a hydrogen rich fraction which can be utilized downstream as in the present process. While overcoming many of the disadvantages of the prior art systems that deal with the recovery of hydrogen and carbon dioxide from such streams, this can be accomplished by integrating a carbon dioxide separation unit, a hydrogen selective membrane separation unit and a carbon dioxide selective membrane separation unit into the process for treating streams taken from such process units in the manner noted herein. In addition, increased production of hydrogen and carbon dioxide capture of equal to or greater than 90% from syngas in hydrogen generation plants may also be accomplished by integrating a carbon dioxide separation unit, a hydrogen selective membrane separation unit and a carbon dioxide selective membrane separation unit into the schematic of a hydrogen generation plant. Accordingly, two main processes are proposed herein.

With regard to the first noted process, the proposed schematic includes a process unit, an optional compressor, a heat exchanger, a carbon dioxide separation unit, a hydrogen selective membrane separation unit and a carbon dioxide selective membrane separation unit. With regard to the second noted process, the proposed schematic includes an optional pre-reformer unit, a steam methane reformer unit, a water gas shift reactor, a pressure swing adsorption unit, an optional compressor, a heat exchanger, a carbon dioxide separation unit, a hydrogen selective membrane separation unit and a carbon dioxide selective membrane separation unit.

The processes of the present invention will be further described with regard to the figures contained herein. These figures are included merely for illustration purposes and are not intended in any way to limit the processes of the present invention. The first process of the present invention as depicted in FIG. 1 involves the recovery of hydrogen and carbon dioxide from a process stream (1) that is obtained from a process unit (0). As used herein, the phrase "process unit" refers to any unit which includes a purification step that results in the production of a hydrogen rich fraction that can be used downstream. More specifically, the "process unit" is a unit in which as one step of the process, hydrogen is removed from a feed stream in such a manner that allows for the recovery of hydrogen in a more concentrated form than presented in the original noted feed stream—a hydrogen rich fraction that is the product stream (23)—and a tail gas stream that is the process stream (1).

The feed gas (15) that is supplied to the process unit (0) can be any feed stream that will typically be subjected to treatment for the removal of hydrogen. For example, the feed gas (15) may be a feed gas (15) from a reformer unit/water gas shift unit, syngas from a coal gasification unit, refinery off gas or any other gas mixture that contains hydrogen, carbon monoxide and carbon dioxide as components in the gas mixture. In the more typical situation, the feed gas (15) will be the product of a hydrocarbon containing feed stream (16) that has been subjected to at least steam hydrocarbon reforming (preferably steam methane reforming) (not shown in FIG. 1). In a further embodiment, the feed gas (15) will be the product of a hydrocarbon feed stream (16) that has been subjected to at least steam hydrocarbon reforming and water gas shift (not shown in FIG. 1). In a still further embodiment, the feed gas (15) will be the product of a gas stream that has been subjected to pre-reforming and steam hydrocarbon reforming and finally, the product of a gas stream that has been subjected to pre-reforming, steam hydrocarbon reforming and water gas shift (not shown in FIG. 1). Each of these is described more specifically below with regard to the second process. In addition, those of ordinary skill in the art will recognize that the present invention is not meant to be limited by the hydrocarbon feed stream (16) which will ultimately form the feed gas (15) utilized in the present invention. Depending upon the source of the hydrocarbon feed streams (16), those of ordinary skill in the art will recognize that there will likely be small amounts of other components present in the ultimate feed gas (15), e.g. inerts such as nitrogen. Accordingly, while reference is made herein in more general terms to the major components (such as hydrogen, carbon monoxide, carbon dioxide, methane and water vapor) of the hydrocarbon feed streams (16) and feed gas (15), those skilled in the art will recognize that inerts such as nitrogen are also present and make up part of the stream.

Preferably, the process unit (0) utilized will be a pressure swing adsorption unit that is used to recovery and purify hydrogen, although those of ordinary skill in the art will recognize that any other unit that functions to carry out hydrogen purification may is also contemplated to be within the scope of the present invention. The pressure swing adsorption unit utilized can be any pressure swing adsorption unit known in the art and can comprise anywhere from two to twelve adsorption beds (not shown) although more adsorption beds may be utilized. During the process of hydrogen purification, each of the adsorption beds (not shown) will individually under go a cycle that comprises: a) pressurization with pure hydrogen product, b) constant feed and hydrogen product release; c) pressure equalization to transfer high pressure hydrogen-rich void gas to another bed at low pressure, the other bed being about to commence product pressurization; d) depressurization to slightly above atmospheric pressure; e) purge using product hydrogen; and f) pressure equalization with another bed at higher pressure to accept hydrogen-rich void gas. Preferably the adsorbents used in the pressure swing adsorption unit (0) include, but are not limited to, activated alumina, activated carbon, zeolite and their combinations. As a result of hydrogen purification, two separate gas streams are obtained—one that is a gaseous medium to very high purity hydrogen stream that is withdrawn and used as a hydrogen product (23) and the other which is often referred to as a pressure swing adsorption tail gas (referred to hereinafter as the "process stream") which is withdrawn after desorption of the adsorption bed as process stream (1). The process stream (1) is withdrawn from the adsorption beds of the pressure swing adsorption unit during the depressurization and purge steps. As used herein, the phrase "medium to very high purity hydrogen stream" refers to greater than 99% hydrogen. Furthermore, as used herein, the phrase "high purity hydrogen stream" refers to greater than 99.9% Hydrogen.

The removal of hydrogen product (23) from the feed gas (15) in the process unit (0) results in a process stream (1) that is purged from the process unit (0). This process stream (1) contains at least carbon dioxide, hydrogen and methane. Typically, the process stream contains at least methane, carbon monoxide, carbon dioxide, water, and any unrecovered hydrogen.

In the process of the present invention as depicted in FIG. 1, the process stream (1) obtained from the process unit (0) is further treated to remove additional hydrogen and carbon dioxide by passing the process stream (0) through a carbon dioxide separation unit (4), a hydrogen selective membrane unit (7) and a carbon dioxide selective membrane unit (10).

Prior to being introduced into the carbon dioxide separation unit (4), the process stream (1) obtained is optionally compressed in a first compressor (2). As used throughout, the term "compressor" is meant to include not only a compressor that has a single stage for compression but also a compressor that includes multiple stages for compression (typically from two to eight stages) with means for cooling between the various stages of the compressor. Note that the number of stages necessary to achieve the desired level of compression (pressure) depends on the inlet/outlet pressure ratio. Such determinations are readily apparent (determinable) to those skilled in the art. The degree of compression at this stage of the process (prior to the cooling of the stream will depend in part upon the configuration of the carbon dioxide separation unit (4). More specifically, when the carbon dioxide separation unit (4) does not include a compressor, the process stream (1) will be compressed to a pressure equal to or greater than 35 bar prior to the cooling in the heat exchanger (3) of the present process as depicted in FIG. 1. However, when the carbon dioxide separation unit (4) does include a compressor as a component of the carbon dioxide separation unit (4) which allows for the process stream (1) to be compressed either prior to or as a part of the actual separation and purification steps within the carbon dioxide separation unit (4), then only partial compression or no compression will take place prior to the cooling step in the heat exchange (3) of the present process. The intent is to have a process steam (1) that is at a pressure equal to or greater than 35 bar while being treated in the carbon dioxide separation unit (4). More specifically, in order to accomplish this degree of compression, the process stream (1) may be compressed in a variety of manners. For example, the process stream (1) may be compressed in whole (to equal to or greater than 35 bar) or in part (compression to a pressure less than 35 bar in compressor (2) but when further compressed downstream (in a compressor that is a component of the carbon dioxide separation unit (4)) achieves a level of compression that is equal to or greater than 35 bar) provided that the final pressure of the process stream (1) is equal to or greater than 35 bar. For example, for a process stream (1) that is at a pressure of 20 bar, it may be possible to increase the pressure in the compressor (2) to 30 bar prior to the cooling of the stream in the heat exchanger (3) and then raise the pressure to 37 bar in the compressor that is a component of the carbon dioxide separation unit (4). Preferably, the process stream (1) is compressed to above 50 bar while being treated in the carbon dioxide separation unit (4). Most of the compression, if not all, is preferably accomplished in the compressor (2) prior to cooling (before being introduced into the carbon dioxide separation unit (4)). Those skilled in the art will recognize that the addition compressor (not shown) while being a part of the carbon dioxide separation unit (4) will for practical reasons, typically be positioned outside of the cold box of the carbon dioxide separation unit (4) (separated from those components that are typically at less than ambient temperature).

The optionally compressed process stream (1) is then subjected to cooling to a temperature that is equal to or less than −10° C. by subjecting the process stream (1) to heat exchange in a heat exchanger (3). Those skilled in the art will recognize that while the heat exchanger (3) of FIG. 1 is positioned outside of the carbon dioxide separation unit (4), this heat exchanger (3) for all practical purposes is considered to be a part of the carbon dioxide separation unit (4). In a preferred embodiment, the process stream (1) is cooled to a temperature that is equal to or less than −30° C. Any type of heat exchanger (3) that is known in the art may be utilized to cool the process stream (1) to the desired temperature.

The next step of the process involves the separation and purification of the cooled process stream (1) in a carbon dioxide separation unit (4) to produce a carbon dioxide rich liquid stream (6) and a carbon dioxide lean non-condensable stream (5). The carbon dioxide separation unit (4) may be any unit which is capable of separating/purifying carbon dioxide from a stream that contains carbon dioxide at a temperature that is equal to or less than −10° C., preferably equal to or less than −40° C. In other words, the carbon dioxide separation occurs at sub-ambient temperatures and conditions. Those of ordinary skill in the art recognize that such sub-ambient separation/purification is known in the art. Accordingly, the present process is not meant to be limited by the carbon dioxide separation unit (4) or the process for carrying out the separation/purification in the carbon dioxide separation unit (4). As used throughout with regard to the present invention, the phrase "carbon dioxide separation unit" refers not only to the liquefaction units and/or distillation columns included therein, but also to all of the additional components that typically are considered to make up a carbon dioxide separation unit (4), including, but not limited to, one or more components selected from additional heat exchangers, additional compressors, dryers, etc. With regard to the present carbon dioxide separation unit (4), the separation/purification is typically carried out utilizing single or multi-step partial liquefaction as depicted in FIG. 2 which includes one liquefaction unit (14); single or multi-step partial liquefaction in combination with at least one distillation column as depicted in FIG. 3 which includes two liquefaction units (14) and one distillation column (24); and single or multi-step partial liquefaction in combination with at least one distillation column and at least one compressor and/or heat exchanger as depicted in FIG. 4 which includes two liquefaction units (14), one distillation column (24), one compressor (25) and one heat exchanger (26). When two or more liquefaction units (14) are included in the carbon dioxide separation unit (4), those skilled in the art will recognize that liquefaction within each of these units may take place at the same temperature (with different pressures) or at different temperatures (with the same pressure). In any event, the temperature for such liquefaction will generally be between about −10° C. and −57° C., preferably between about −30° C. and −57° C. In addition, note that with regard to FIG. 4, while the compressor (25) and heat exchanger (26) are outside of the box (4) which denotes the carbon dioxide separation unit (4), they are still considered to be a part of the carbon dioxide separation unit (4) and are simply included where they are for feasibility purposes (outside of the cold box).

As a result of the separation/purification that takes place in the carbon dioxide separation unit (4), there is produced a carbon dioxide lean non-condensable stream (5) and a carbon dioxide rich liquid stream (6). The carbon dioxide rich liquid stream (6) is withdrawn from the carbon dioxide separation unit (4) as a product stream and directed for further use. In addition, note that while cooling in the heat exchanger (26) of the carbon dioxide separation unit (4) can be accomplished utilizing an external coolant such as ammonia, the carbon dioxide rich liquid stream (6) may also be used, prior to the stream being withdrawn from the carbon dioxide separation unit (4), to provide cooling within the heat exchanger (26) of the carbon dioxide separation unit (4). Those of ordinary skill in the art will recognize that such streams (6) will typically include from about 90% to more than 99.9% carbon dioxide and may be used for enhanced oil recovery, industrial uses, sequestration in geological formations, etc. This carbon dioxide rich liquid stream (6) can be utilized as a liquid or may be vaporized to produce a carbon dioxide rich gas stream.

The carbon dioxide non-condensable stream (5) that is withdrawn from the carbon dioxide separation unit is typically at a high or medium pressure since the process stream (1) treated in the carbon dioxide separation unit (4) will be at a pressure that is equal to or greater than 35 bar. As used herein with regard to the carbon dioxide non-condensable stream (5), the phrase "high pressure" refers to a pressure that ranges from about 50 bar to about 100 bar, preferably from about 50 bar to about 80 bar. As used herein with regard to the carbon dioxide non-condensable stream (5), the phrase "medium pressure" refers to a pressure that ranges from about 10 bar to about 49 bar, preferably from about 25 bar to about 49 bar.

Once the carbon dioxide lean non-condensable stream (5) is withdrawn from the carbon dioxide separation unit (4), it is passed through a hydrogen selective membrane separation unit (7) where the hydrogen passes through the hydrogen selective membrane to form a hydrogen rich permeate stream (8). As used herein with regard to the hydrogen rich permeate stream (8), the phrase "hydrogen rich" refers to the permeate stream having a percentage of hydrogen that is greater than the percentage of the other components in the hydrogen rich permeate stream (8). The hydrogen selective membrane preferentially permeates hydrogen over carbon monoxide, carbon dioxide and methane as well as any other components in the stream being subjected to the hydrogen selective membrane. In the preferred embodiment of the present process, the hydrogen selective membrane utilized has a hydrogen permeability that is at least 1.25, preferably 5, more preferably 8 and even more preferably 12, times that of the gas or gases from which the hydrogen is separated under the chosen operating conditions. Fluid permeation through a polymeric membrane can be described as the overall mass transport of a fluid species across the membrane, where the fluid species is introduced as feed at a higher pressure than the pressure on the opposite of the membrane, which is commonly referred to as the permeate side of the membrane. Typically in a separation process, the fluid species is a mixture of several components, at a minimum two, with the membrane exhibiting a higher selectivity for one component (for example "component A") over the other component (for example "component B"). Component A permeates faster than component B, therefore relative to the feed, the permeate is enriched in component A and the portion of the feed that does not permeate, commonly referred to as the retentate or residue is enriched in component B. With regard to this particular invention, the fluid is in a gaseous form and the polymeric continuous phase of the active membrane layer is nonporous. By "nonporous" it is meant that the continuous phase is substantially free of cavities or pores formed in a network through which migrating components of the gas mixture may flow from the feed to the permeate side of the membrane.

Transmembrane rate of transport of migrating components through the polymeric continuous phase is commonly referred to as flux and is driven primarily by molecular solution/diffusion mechanisms. Preferably, the polymer is selectively gas permeable to the components, meaning that the gases to be separated from each other permeate the membrane at different rates. That is, a highly permeable gas will travel a distance through the continuous phase faster than will a less permeable gas. The selectivity of a gas permeable polymer is the ratio of the permeabilities of the individual component gases, e.g. Permeability of component A to permeability of component B. Hence, the greater the difference between transmembrane fluxes of individual components, the larger will be the component pair selectivity of a particular polymeric membrane.

With regard to the present process, the permeate stream that is obtained will generally contain from about 40% to about 90% hydrogen with the remaining part of the permeate stream comprising the other components contained in the carbon dioxide non-condensable stream (5). In an alternative embodiment of the present process, the carbon dioxide non-condensable stream (5) can be treated in the hydrogen selective membrane separation unit (7) at low pressure in order to increase the recovery of hydrogen. As used herein with regard to the carbon dioxide non-condensable stream (5), the phrase "low pressure" refers to a pressure that is equal to or less than 10 bar, preferably from about equal to or less than 1 bar absolute to less than 10 bar. Note that when the carbon dioxide non-condensable stream (5) is permeated at low pressure, the carbon dioxide non-condensable stream (5) pressure is reduced (as it will be at high to medium pressure) by any method known in the art such as one or more valves, a turbine, etc. (not shown). In a still further embodiment, the hydrogen rich permeate stream (8) is permeated at the same pressure as the feed gas (15) of the process unit (0).

The remaining components in the carbon dioxide lean non-condensable stream (5) form a hydrogen lean residue stream (9). As used herein with regard to the hydrogen lean residue stream (9), the phrase "hydrogen lean" refers to the residue stream having a percentage of hydrogen that is less than that in the carbon dioxide non-condensable sream (5).

The hydrogen selective membrane separation unit (7) utilized in the process of the present invention contains at least one membrane that is selective for hydrogen over the other components in the carbon dioxide lean non-condensable stream (5). Note that the target molecule, in this case hydrogen, determines how the permeate stream is used. With regard to each of the membranes utilized in the present process, each membrane has a permeate side (7.1) and a residue side (7.2). Since the membrane is selective for hydrogen, it allows for the passing of hydrogen through the membrane to the permeate side (7.1) of the membrane. While a variety of different types of membranes may be utilized in the hydrogen selective membrane separation unit (7) of the process of the present invention, the preferred membrane is a polymeric membrane that is selective for hydrogen that is selected from one or more polyamides, polyaramides, polybenzimidazoles, polybenzimidazole blends with polyimides, polyamides/imides. Hydrogen selective membranes will have a $H_2/CO_2$ selectivity given by the ratio of $H_2$ permeance to the $CO_2$ permeance at the operating conditions that is greater than 1.25, preferably greater than 5, more preferably greater than 8. In a preferred embodiment of the present invention, the polymeric membranes of the first hydrogen selective membrane separation unit (4) and the second hydrogen selective membrane separation unit (11) will be made of the same polymeric materials.

The hydrogen selective membranes of the present invention can be fabricated into any membrane form by any appropriate conventional method. For example, the hydrogen selective membranes may be cast as a sheet at the desired thickness onto a flat support layer (for flat sheet membranes), or extruded through a conventional hollow fiber spinneret (for hollow fiber membranes). Processes for preparing uniformly dense membranes or asymmetric membranes are also available and known to those skilled in the art. In addition, it is possible to prepare composite membranes by casting or extruding the membrane over a porous support of another material in either flat film or hollow fiber form. The separating layer of the composite membrane can be a dense ultra-thin or asymmetric film. In the preferred embodiment of the present process, the hydrogen selective membranes are in the form of modules comprising membranes formed as either hollow fibers or spiral wound asymmetric flat sheets.

The hydrogen selective membrane separation unit (7) includes at least one of the above noted membranes. With regard to the actual configuration of the hydrogen selective membrane separation unit (7), the hydrogen selective membrane separation unit (7) can take on any number of configurations. In one embodiment, there is only one membrane element in the hydrogen selective membrane separation unit (7). In an alternative embodiment, the hydrogen selective membrane separation unit (7) comprises a series of hydrogen selective membrane elements within a single membrane housing (not shown). With regard to this embodiment, the series of hydrogen selective membranes can be made up of hydrogen selective membranes of the same type selected from the hydrogen selective membranes detailed above or of two or more different hydrogen selective membranes selected from the hydrogen selective membranes detailed above. In the embodiment where there are two or more hydrogen selective membranes, the hydrogen selective membranes will preferably be of the same type and the same fabrication (for example, sheets or fibers). In a still further embodiment concerning the configuration of the hydrogen selective membrane separation unit (7), the hydrogen selective membrane separation unit (7) comprises two or more membrane housings with each of the housings having one or more hydrogen selective membranes as described hereinbefore. More specifically, in this embodiment, there can be two or more membrane housings, with each of the housings having either one hydrogen selective membrane or two or more hydrogen selective membranes of the same type or two or more hydrogen selective membranes of two of more different types. The resulting hydrogen selective membranes may be mounted in any convenient type of housing or vessel adapted to provide a supply of the carbon dioxide non-condensable stream (5), and removal of the permeate stream (7.1) and residue stream (7.2). The housing also provides a high-pressure side (for the carbon dioxide non-condensable stream (5) and the residue stream) and a low-pressure side of the hydrogen selective membrane (for the permeate stream). As an example of configurations contemplated to be within the present invention, flat-sheet membranes can be stacked in plate-and-frame modules or wound in spiral-wound modules. Hollow-fiber membranes can be potted with a thermoset resin in cylindrical housings. The final hydrogen selective membrane separation unit (7) comprises one or more membrane modules or housings, which may be housed individually in pressure vessels or multiple elements may be mounted together in a sealed housing of appropriate diameter and length.

As noted above, as a result of passing the carbon dioxide non-condensable stream (5) through the hydrogen selective membrane separation unit (7), two separate streams are formed—a hydrogen rich permeate stream (8) and a hydrogen lean residue stream (9). The hydrogen rich permeate stream (8) is optionally compressed in a second compressor (13) before being recycled for use as a supplemental feed stream for the process unit (0). In addition, the hydrogen rich permeate stream (8) may also be used as a supplemental feed stream for other processes besides that of the present invention.

In the next step of the present process, the hydrogen lean residue stream (9) is passed through a carbon dioxide selective membrane separation unit (10) in order to form a carbon dioxide enrich permeate stream (11). As used herein with regard to the carbon dioxide enriched permeate stream (11), the phrase "carbon dioxide enrich" refers to the permeate stream having a percentage of carbon dioxide that is greater than the percentage of the other components in the carbon dioxide enriched permeate stream (11). The carbon dioxide selective membrane of the carbon dioxide selective membrane separation unit (10) is used to preferentially permeate carbon dioxide over carbon monoxide, methane and nitrogen as well as any other components in the stream being subjected to the carbon dioxide selective membrane. In the preferred embodiment of the present process, the carbon dioxide selective membrane utilized had a carbon dioxide permeability that is more than 5 times, preferably greater than 10 times and even more preferably greater than 20 times that of the gas or gases from which the carbon dioxide is separated under the chosen operating conditions, with the exception of hydrogen.

The remaining components in the hydrogen lean residue stream (9) form a carbon dioxide depleted residue stream (12). As used herein with regard to the carbon dioxide depleted residue stream (12), the phrase "carbon dioxide depleted" refers to the residue stream having a percentage of carbon dioxide that is less than that in the stream introduced into the carbon dioxide membrane separation unit (10) (the hydrogen lean residue stream (9)).

The carbon dioxide selective membrane separation unit (10) utilized in the process of the present invention contains at least one membrane that is selective for carbon dioxide over the other components in the hydrogen lean residue stream (9). Note that the target molecule, in this case carbon dioxide, determines how the permeate stream is used. With regard to each of the membranes utilized in the present process, each carbon dioxide selective membrane has a permeate side (10.1) and a residue side (10.2). Since the membrane is selective for carbon dioxide, it allows for the passing of carbon dioxide through the membrane to the permeate side (10.1) of the membrane.

While a variety of different types of membranes may be utilized in the carbon dioxide selective membrane separation unit (10) of the process of the present invention, the preferred membrane is a polymeric membrane that is selective for carbon dioxide that is selected from one or more polyimides, polyetherimides polysulfone, polyethersulfones, polyarylsulfone, polycarbonate, tetrabromo-bisphenol A polycarbonate, tetrachloro-bisphenol A polycarbonate, polydimethylsiloxane, natural rubber, cellulose actetate, cellulose triacetate, ethyl cellulose, PDD-TFE and polytriazole.

With regard to each of the carbon dioxide selective membranes utilized in the carbon dioxide selective membrane separation unit (10) of the present process, each carbon dioxide selective membrane has a permeate side (10.1) and a residue side (10.2). Since the membrane is selective for carbon dioxide, it allows for the passing of carbon dioxide through the membrane to the permeate side (10.1) of the membrane. While the membrane is selective for carbon dioxide, those skilled in the art will recognize that a minor portion of the other components in the hydrogen lean residue stream (9) will also pass through the carbon dioxide selective membrane to become a part of the permeate. Accordingly, with regard to the present process, the permeate stream that is obtained will generally contain from about 40% to about 90% carbon dioxide with the remaining part of the permeate stream comprising the other components contained in the hydrogen lean residue stream (9). As a result of passing the hydrogen lean residue stream (9) into the carbon dioxide selective membrane separation unit (10) and through the membrane, this stream is separated into two streams—one which is considered to be carbon dioxide enriched and one which is considered to be carbon dioxide depleted.

While a variety of different types of membranes may be utilized in the carbon dioxide selective membrane separation unit (10) of the process of the present invention, the preferred membrane is made of any number of polymers that are suitable as membrane materials. With regard to the membranes of the present invention, these polymers include, but are not limited to, substituted or unsubstituted polymers selected from polysiloxane, polycarbonates, silicone-containing polycarbonates, brominated polycarbonates, polysulfones, polyether sulfones, sulfonated polysulfones, sulfonated polyether sulfones, polyimides and aryl polyimides, polyether imides, polyketones, polyether ketones, polyamides including aryl polyamides, poly(esteramide-diisocyanate), polyamide/imides, polyolefins such as polyethylene, polypropylene, polybutylene, poly-4-methyl pentene, polyacetylenes, polytrimethysilylpropyne, fluorinated polymers such as those formed from tetrafluoroethylene and perfluorodioxoles, poly(styrenes), including styrene-containing copolymers such as acrylonitrile-styrene copolymers, styrene-butadiene copolymers and styrene-vinylbenzylhalide copolymers, cellulosic polymers, such as cellulose acetate-butyrate, cellulose propionate, ethyl cellulose, methyl cellulose, cellulose triacetate, and nitrocellulose, polyethers, poly(arylene oxides) such as poly(phenylene oxide) and poly(xylene oxide), polyurethanes, polyesters (including polyarylates), such as poly(ethylene terephthalate), and poly(phenylene terephthalate), poly(alkyl methacrylates), poly(acrylates), polysulfides, polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ketones), poly(vinyl ethers), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates), polyallyls, poly(benzobenzimidazole), polyhydrazides, polyoxadiazoles, polytriazoles: poly(benzimidazole), polycarbodiimides, polyphosphazines, and interpolymers, including block interpolymers containing repeating units from the above such as terpolymers of acrylonitrile-vinyl bromide-sodium salt of para-sulfophenylmethallyl ethers, and grafts and blends containing any of the foregoing. The polymer suitable for use is intended to also encompass copolymers of two or more monomers utilized to obtain any of the homopolymers or copolymers named above. Typical substituents providing substituted polymers include halogens such as fluorine, chlorine and bromine, hydroxyl groups, lower alkyl groups, lower alkoxy groups, monocyclic aryl, lower acyl groups and the like.

With regard to one embodiment of the present invention, the preferred polymers include, but are not limited to, polysiloxane, polycarbonates, silicone-containing polycarbonates, brominated polycarbonates, polysulfones, polyether sulfones, sulfonated polysulfones, sulfonated polyether sulfones, polyimides, polyetherimides, polyketones, polyether ketones, polyamides, polyamide/imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate. Examples of preferred polyimides are Ultem 1000, P84 and P84-HT polymers, and Matrimid 5218.

Of the above noted polymeric membranes, the most preferred membranes are those made of polyimides. More specifically, polyimides of the type disclosed in U.S. Pat. Nos. 7,018,445 and 7,025,804, each incorporated herein in their entirety by reference. With regard to these types of membranes, the process of the present invention preferably utilizes a membrane comprising a blend of at least one polymer of a Type 1 copolyimide and at least one polymer of a Type 2 copolyimide in which the Type 1 copolyimide comprises repeating units of formula I

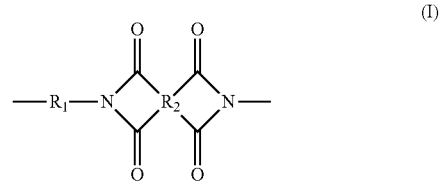

(I)

in which $R_2$ is a moiety having a composition selected from the group consisting of formula A, formula B, formula C and a mixture thereof,

(A)

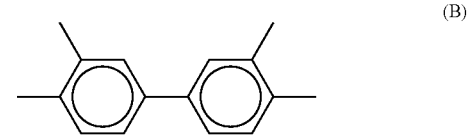

(B)

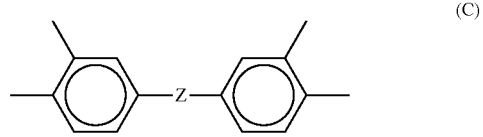

(C)

Z is a moiety having a composition selected from the group consisting of formula L, formula M, formula N and a mixture thereof; and

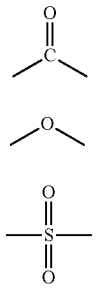

(L)

(M)

(N)

$R_1$ is a moiety having a composition selected from the group consisting of formula Q, formula S, formula T, and a mixture thereof,

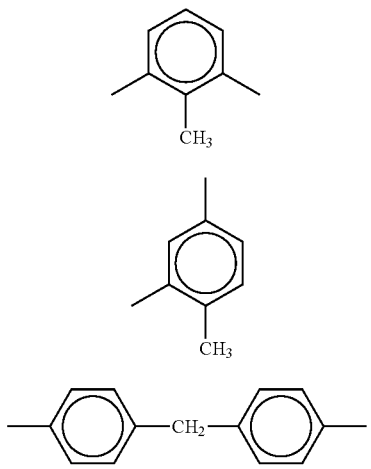

(Q)

(S)

(T)

in which the Type 2 copolyimide comprises the repeating units of formulas IIa and IIb

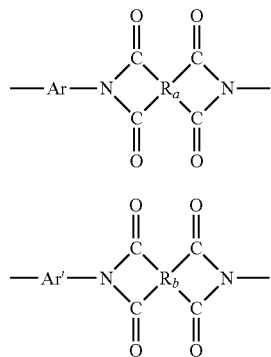

(IIa)

(IIb)

in which Ar is a moiety having a composition selected from the group consisting of formula U, formula V, and a mixture thereof,

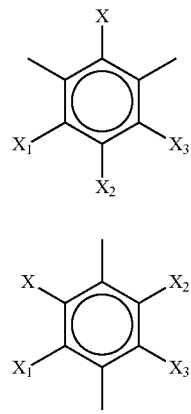

(U)

(V)

in which

X, $X_1$, $X_2$, $X_3$ independently are hydrogen or an alkyl group having 1 to 6 carbon atoms, provided that at least two of X, $X_1$, $X_2$, or $X_3$ on each of U and V are an alkyl group, Ar' is any aromatic moiety, $R_a$ and $R_b$ each independently have composition of formulas A, B, C, D or a mixture thereof, and

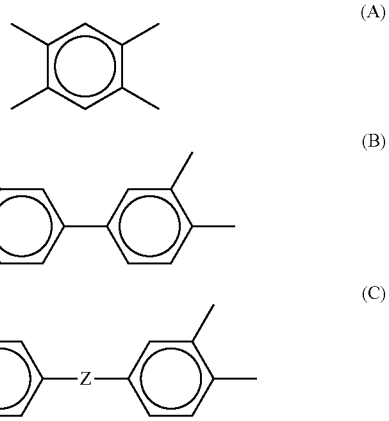

(A)

(B)

(C)

(D)

Z is a moiety having composition selected from the group consisting of formula L, formula M, formula N and a mixture thereof

(L)

(M)

-continued

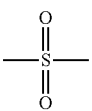
(N)

The material of the membrane consists essentially of the blend of these copolyimides. Provided that they do not significantly adversely affect the separation performance of the membrane, other components can be present in the blend such as, processing aids, chemical and thermal stabilizers and the like.

In a preferred embodiment, the repeating units of the Type 1 copolyimide have the composition of formula Ia.

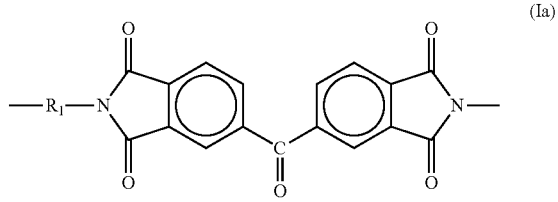
(Ia)

Wherein $R_1$ is as defined hereinbefore. A preferred polymer of this composition in which it is understood that $R_1$ is formula Q in about 16% of the repeating units, formula S in about 64% of the repeating units and formula T in about 20% of the repeating units is available from HP Polymer GmbH under the tradename P84

In another preferred embodiment, the Type 1 copolyimide comprises repeating units of formula Ib.

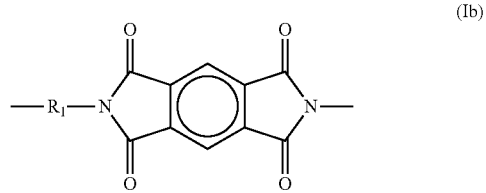
(Ib)

Wherein $R_1$ is as defined hereinbefore. Preference is given to using the Type 1 copolyimide of formula Ib in which $R_1$ is a composition of formula Q in about 1-99% of the repeating units, and of formula $_s$ in a complementary amount totaling 100% of the repeating units.

In yet another preferred embodiment, the Type 1 copolyimide is a copolymer comprising repeating units of both formula Ia and Ib in which units of formula Ib constitute about 1-99% of the total repeating units of formulas Ia and Ib. A polymer of this structure is available from HP Polymer GmbH under the tradename P84-HT325.

In the Type 2 polyimide, the repeating unit of formula IIa should be at least about 25%, and preferably at least about 50% of the total repeating units of formula IIa and formula IIb. Ar' can be the same as or different from Ar.

The polyimides utilized to form the membranes of the present process will typically have a weight average molecular weight within the range of about 23,000 to about 400,000 and preferably about 50,000 to about 280,000.

The carbon dioxide selective membranes of the present process can be fabricated into any membrane form by any appropriate conventional method as noted hereinbefore with regard to the hydrogen selective membranes (i.e., flat sheet membranes or hollow fiber membranes). While the carbon dioxide selective membranes do not have to be in the same form as the hydrogen selective membranes, in one preferred embodiment, the form of the carbon dioxide selective membranes is in the hollow fiber form and the hydrogen selective membranes are in the same form.

As with the hydrogen selective membrane separation unit (7), the carbon dioxide membrane separation unit (10) includes at least one of the above noted membranes. With regard to the actual configuration of the carbon dioxide selective membrane separation unit (10), the carbon dioxide selective membrane separation unit (10) can take on any number of different configurations as discussed hereinbefore with regard to the hydrogen selective membrane separation unit (7).

As noted, as a result of passing the hydrogen lean residue stream (9) through the carbon dioxide selective membrane separation unit (10), two separate streams are formed—a carbon dioxide enriched permeate stream (11) and a carbon dioxide depleted residue stream (12) wherein the enrichment and depletion of carbon dioxide is with reference to the feed stream fed to the carbon dioxide selective membrane separation unit (10). The carbon dioxide enriched permeate stream (11) may be further utilized in a variety of manners. More specifically, the carbon dioxide enriched permeate stream (11) may be recycled to the process stream (1) from the process unit (0) where is it added to the process stream (1) prior to the compressor (2) (as shown in FIG. 1) or within the compressor (2) between two of the stages of compression (not shown in FIG. 1) or optionally compressing the carbon dioxide enriched permeate stream (11) and recycling the optionally compressed carbon dioxide enriched permeate stream (11) to be used as a supplemental feed stream in other processes such as a supplemental feed stream for a water gas shift reactor in a hydrogen production plant. The carbon dioxide enriched permeate stream (11) may also be recycled directly back to the carbon dioxide separation unit (4) for further processing.

The carbon dioxide depleted residue stream (12) that is obtained from the carbon dioxide selective membrane separation unit (10) can be withdrawn for further use. For example, the carbon dioxide depleted residue stream (12) can be used as a fuel (for example as a steam methane reformer fuel), as a feed stream (for example as a steam methane reformer feed stream) or as both a fuel and a feed stream in other processes such as in a hydrogen generation plant. In addition, the carbon dioxide depleted residue stream (12) can be used to regenerate any dryers that may be positioned within the process schematic of the present invention to remove moisture, thereby increasing the efficiency of carbon dioxide removal in the carbon dioxide separation unit (4) at lower temperatures.

The operating temperatures for the hydrogen selective membranes and the carbon dioxide selective membranes are each independently selected based on the physical properties of each membrane such that it is mechanically stable and a sufficient gas flux can be maintained across the membrane. Typically, the stream being fed to each of the membrane separation units (7, 10) will be heated or cooled, if necessary, to a temperature which ranges from about −55° C. to about 150° C. In other words, the process of membrane separation in each of these units (7, 10) typically operates at the noted temperature. In one alternative, the hydrogen lean reside stream (9) is fed into the carbon dioxide selective membrane unit (10) at low to sub-ambient temperatures, preferably from −55° C. to about 30° C., preferably from −55° C. to about 10° C. In such cases, the carbon dioxide selective membranes are cold membranes. In still another alternative, the carbon dioxide lean non-condensable stream (5) from the carbon dioxide separation unit (4) is fed to the hydrogen selective membrane separation unit (7) after being heated to a temperature from about 50° C. to about 150° C. in an optional heat exchanger 28. With regard to this particular alternative, the heat brought to the carbon dioxide lean non-condensable stream (5) is taken from the process stream (1) after the step of compression.

Accordingly, the final embodiment of the present invention as depicted in FIG. 5 relates to a process for producing hydrogen in a hydrogen generation plant from a hydrocarbon containing feed stream (16) (preferably natural gas) and capturing at least 90%, preferably at least 99%, even more preferably approaching or obtaining 100% capture, of the overall emissions of carbon dioxide of the steam methane reformer utilizing a carbon dioxide separation unit and two membrane separation units. More specifically, in the process of the present invention, the process can be executed in a variety of manners including: 1) using a pre-reformer (17), a steam methane reformer (19), a water gas shift reactor (21), a pressure swing adsorption unit (0), a carbon dioxide separation unit (4), a hydrogen selective membrane separation unit (7) and a carbon dioxide selective membrane separation unit (10) or 2) a steam methane reformer (19), a water gas shift reactor (21), a pressure swing adsorption unit (0), a carbon dioxide separation unit (4), a hydrogen selective membrane separation unit (7) and a carbon dioxide selective membrane separation unit (10). In this particular process, a hydrocarbon containing feed stream (16) is optionally pre-reformed in at least one pre-reformer (17) to form a pre-reformed gas stream (18). Pre-reforming is carried out in those cases where it is considered to be advantageous to reform the heavier hydrocarbons in the hydrocarbon containing feed stream (16) thereby reducing cracking on the catalyst in the main steam methane reformer (19) and preventing excessive heat rise in the main reformer. The present process is not meant to be limited by the type of pre-reformer (17) utilized for carrying out the process of the present invention. Accordingly, any pre-reformer (17) that is known in the art may be used in the process of the present invention. The pre-reformer (17) can be a single high pressure (typically from about 25 to about 30 bar) adiabatic vessel where desulfurized natural gas preheated to around 600° C. is fed to a bed filled with pre-reforming catalyst (typically catalyst with a high nickel content). Such vessels typically have an outlet temperature around 400° C. The pre-reformer (17) can also be a series of at least two adiabatic pre-reformers (17) with heating in between the vessels in order to provide additional benefits by minimizing the amount of fuel required and thus the amount of hydrogen to fuel. The advantage of such pre-reformers (17) is that the overall need for fuel to provide direct heat to the reforming reaction is reduced, hence naturally decreasing carbon dioxide production in the plant (leading to the high overall carbon dioxide recovery). In addition, the pre-reformer (17) may be operated in the same manner that is known in the art utilizing general conditions, including temperatures and pressures.

The next step of the process involves reforming the pre-reformed gas stream (18) (or in the case where there is no pre-reforming, the hydrocarbon containing gas stream (16)) in a steam methane reformer unit (19) in order to obtain a syngas stream (20). As with the pre-reformer (17), the present invention is not meant to be limited by the steam methane reformer unit (19) or the process for carrying out the reaction in the steam methane reformer unit (19). Accordingly, any steam methane reformer unit (19) known in the art may be used in the process of the present invention. By way of general description, with regard to the steam methane reformer unit (19) of FIG. 5, the pre-reformed gas stream (18) (or hydrocarbon containing gas stream (16)) will be combined with high pressure steam (not shown in FIG. 5) before entering the steam methane reforming unit (19). Such steam methane reformer units (19) typically contain tubes (not shown) packed with catalyst (typically a nickel catalyst) through which the steam and gas stream (18) mixtures passes. An elevated temperature of about 860° C. is typically maintained to drive the reaction which is endothermic. As used throughout with regard to the present invention, the phrase "steam methane reformer unit" refers not only to the actual reformer units, but also to all of the additional components that typically are considered to make up a steam methane reformer, including, but not limited to, one or more components selected from heat exchangers, the reformer, tubes with one or more types of catalyst, etc. Prior to be introduced into the actual reformer of the steam methane reformer (19), the stream to be treated will typically be compressed, e.g. to about 200 to 600 psig, and combined with the steam as described hereinbefore. In those instances where pre-reforming is utilized, the stream to be pre-reformed will typically be compressed to e.g., about 200 to 600 psig, thereby resulting in a pre-reformed gas stream (18) which does not require further compression before being introduced into the steam methane reformer (19). The reaction product from the steam methane reformer unit (19) is principally a hydrogen rich effluent that contains hydrogen, carbon monoxide, methane, water vapor and carbon dioxide in proportions close to equilibrium amounts at the elevated temperature and pressure. This effluent is referred to as the syngas stream (20) in the present process.

Once the reforming is carried out, the resulting syngas stream (20) is subjected to a shift reaction in a water gas shift reactor (21) in order to obtain a feed gas (15). The syngas stream (20) is subjected to a shift reaction due to the high amount of carbon monoxide that is often present due to the steam methane reforming (the amount of carbon monoxide actually depends upon the composition of the initial stream injected into the steam methane reformer unit (19)). The water gas shift reactor (21) functions to form additional hydrogen and carbon dioxide by further reacting or treating the syngas stream (20) in order to obtain a feed gas (15) for the process unit (0). The syngas stream (20) is introduced into the water gas shift reactor (21) (which can contain a variety of stages or one stage; various stages not shown) along with steam (not shown) to form additional hydrogen and carbon dioxide. The water gas shift reactor (21) converts the carbon monoxide to carbon dioxide with the liberation of additional hydrogen by reaction at high temperature in the presence of the additional steam. Such reactors (21) typically operate at a temperature from about 200° C. to about 500° C. In some cases the stream from the steam methane reformer (19) will be at a higher temperature so optionally the stream may first be cooled with a heat exchanger (typically a steam generator—not shown) before being passed through the water gas shift reactor (21). In a preferred alternative, the water gas shift reactor (21) is a multiple stage water gas shift reactor which includes high temperature shift (typically about 371° C. or above), medium temperature shift (typically around 288° C.), low temperature shift (typically about 177° C. to 204° C.) or any combination thereof. Such multiple stage water gas shift reactors are known and are used to concentrate the amount of carbon dioxide in the resulting gas stream by the manner in which the shifts are arranged (with the high temperature shift resulting in less carbon monoxide reaction and the low temperature shift resulting in more carbon monoxide reaction).

The feed gas (15) from the water gas shift reactor (21) is then subjected to the process as described hereinbefore involving a process unit (0), a carbon dioxide separation unit (4), a hydrogen selective membrane separation unit (7), and a carbon dioxide membrane separation unit (10), each as described hereinbefore.

In this particular embodiment, the feed gas (15) is introduced into the process unit (0) (in this case a pressure swing adsorption unit) where it undergoes pressure swing adsorption to produce a hydrogen product stream (23) and a process stream (1). While the hydrogen product stream (23) is recovered as product, a portion of this stream (23) can be used for hydrogen fueling of the steam methane reformer (19). The process stream (1) is further treated in the carbon dioxide separation unit as described hereinbefore. As noted previously, the process stream (1) may be compressed in the compressor (2) or in an additional compressor that forms a part of the carbon dioxide separation unit (4). The process stream (1) is cooled in the heat exchanger (3) prior to the separation/purification steps of the carbon dioxide separation unit (4). As a result of treating the process stream (1) in the carbon dioxide separation unit (4), a carbon dioxide rich liquid stream (which can be vaporized) is produced. This stream is withdrawn from the carbon dioxide separation unit (4) where it can be used as product. The remaining components from the process stream (1) form a carbon dioxide lean non-condensable stream (5) which is then passed through a hydrogen selective membrane separation unit (7) thereby forming a hydrogen rich permeate stream (8) and a hydrogen lean residue stream (9). As noted in the previously described process of FIG. 1, the hydrogen rich permeate stream (8) may be optionally compressed in a compressor (13) and recycled to be used as supplemental feed for the process unit (0).

However, when the present embodiment is utilized in a hydrogen generation plant, the hydrogen rich permeate stream (8) may also be used as supplemental feed stream for a steam methane reformer (19) and/or for a water gas shift reactor (21) after optionally compressing the stream and/or or as a supplemental fuel for a steam methane reformer (19). It is especially preferable to use the hydrogen rich permeate stream (8) as a fuel to the steam methane reformer (19) since doing so can result in between 85% and 88% carbon dioxide capture. In addition, by doing so, it is possible to eliminate or reduce the carbon dioxide emissions from the steam methane reformer (19) as the natural gas fuel has been eliminated/minimized.

The hydrogen lean residue stream (9) is passed through the carbon dioxide selective membrane separation unit (10) thereby forming a carbon dioxide enrich permeate stream (11) and a carbon dioxide depleted residue stream (12) as described hereinbefore. The carbon dioxide enriched permeate stream (11) can be recycled in a variety of manners including 1) to the process stream (1) from the process unit (0) where is it added to the process stream (1) just prior to the compressor (2) (as shown in FIG. 5) or within the compressor (2) between two of the stages of compression (not shown in FIG. 5); 2) optionally compressing the carbon dioxide enriched permeate stream (11) and recycling the optionally compressed carbon dioxide enriched permeate stream (11) to be used as a supplemental feed stream processes other than the present process; or recycled directly back to the carbon dioxide separation unit (4) for further processing. The carbon dioxide depleted residue stream (12) that is recovered, after optionally being turbo expanded in a turbo expander (22) (in order to recover compressed gas energy and use this energy to drive other components of the process) can be used as a supplemental feed for the pre-reformer (17) or the steam methane reformer (19). While it is possible to also use the carbon dioxide depleted residue stream (12) as a supplemental fuel for the steam methane reformer (19), when higher levels of capture are desirable, the amount of residue stream (12) used as fuel will need to be minimized (when levels approaching 90% are desired) or eliminated (when levels of carbon dioxide capture approaching 100% are desired).

With regard to this particular process, it is possible to achieve an overall capture rate of carbon dioxide that is equal to or greater than 50%, preferably equal to or greater than 90%, even more preferably equal to or greater than 99%, and even still more preferably approaching or achieving 100% capture, when hydrogen fueling is utilized. Those of ordinary skill in the art will recognize that in order to eliminate possible issues such as build up of inerts (e.g., nitrogen) downstream of the pressure swing adsorption unit in the system, it may be desirable to configure the pressure swing adsorption unit to allow for selectivity for those inerts thereby creating a hydrogen stream which is rich in inerts, this hydrogen stream that is rich in inerts to be used as fuel for the steam methane reformer unit (19).

Note that the use of hydrogen selective membrane and carbon dioxide selective membrane is in order to increase the recovery of hydrogen and carbon dioxide. This can boost hydrogen production and reduce carbon dioxide emissions for the existing plants. It can also reduce the size of reformer, natural gas consumption for the same size new plants with reduced carbon dioxide emissions.

LIST OF ELEMENTS 0 process unit
1 process stream
2 first compressor
3 heat exchanger
4 carbon dioxide separation unit
5 carbon dioxide lean non-condensable stream
6 carbon dioxide rich liquid stream
7 hydrogen selective membrane separation unit
7.1 permeate side of hydrogen selective membrane
7.2 residue side of hydrogen selective membrane
8 hydrogen rich permeate stream
9 hydrogen lean residue stream
10 carbon dioxide selective membrane separation unit
10.1 permeate side of carbon dioxide selective membrane
10.2 residue side of carbon dioxide selective membrane
11 carbon dioxide enrich permeate stream
12 carbon dioxide depleted residue stream
13 second compressor
14 liquefaction unit
15 feed gas
16 hydrocarbon containing feed stream
17 pre-reformer
18 pre-reformed gas stream
19 steam methane reformer unit
20 syngas stream
21 water gas shift reactor
22 turbo expander
23 hydrogen product stream from pressure swing adsorption unit
24 distillation column
25 additional compressor
26 additional heat exchanger
27 cooling element for additional compressor
28 optional heat exchanger

What is claimed is:
1. A process for recovering hydrogen and carbon dioxide from a process stream (1) of a process unit (0), the process stream (1) containing at least carbon dioxide, hydrogen and methane, and the process comprising the steps of:
   a) optionally compressing the process stream (1) in a first compressor (2);
   b) cooling the process stream (1) in a heat exchanger (3) to a temperature equal to or less than −10° C.;
   c) separating and purifying the cooled process stream (1) in a carbon dioxide separation unit (4) to produce a carbon dioxide rich liquid stream (6) and a carbon dioxide lean non-condensable stream (5);
   d) withdrawing the carbon dioxide rich liquid stream (6) as carbon dioxide product for further use;
   e) withdrawing the carbon dioxide lean non-condensable stream (5) from the carbon dioxide separation unit (4) and passing the carbon dioxide lean non-condensable stream (5) through a hydrogen selective membrane separation unit (7) to form a hydrogen rich permeate stream (8) with the remaining components in the carbon dioxide lean non-condensable stream (5) forming a hydrogen lean residue stream (9);
   f) passing the hydrogen lean residue stream (9) through a carbon dioxide selective membrane separation unit (10) to form a carbon dioxide enriched permeate stream (11) with the remaining components in the hydrogen lean residue stream (9) forming a carbon dioxide depleted residue stream (12); and
   g) optionally compressing the hydrogen rich permeate stream (8) in a second compressor (13) and recycling the hydrogen rich permeate stream (8) for use as a supplemental feed stream in the process unit (0) or in other processes, recycling the carbon dioxide enriched permeate stream (11) to the process stream (1) prior to the compressor (2) or within the compressor (2) between stages of compression, or to the carbon dioxide separation unit (4) and withdrawing the carbon dioxide depleted residue stream (12) for further use.

2. The process of claim 1, wherein the process unit (0) is a pressure swing adsorption unit and the process stream (1) is a tail gas from the pressure swing adsorption unit.

3. The process of claim 2, wherein the carbon dioxide depleted residue stream (12) is used to regenerate any dryers that may be used within the process to remove moisture.

4. The process of claim 2, wherein the separation and purification of the cooled process stream in the carbon dioxide separation unit (4) is carried out by single or multi-step partial liquefaction, compression and distillation or any combination of single or multi-step partial liquefaction, compression and distillation.

5. The process of claim 4, wherein the hydrogen selective membrane separation unit (7) includes one or more hydrogen selective membranes, each membrane having a permeate side (7.1) and a residue side (7.2) and allowing for the passing of hydrogen to the permeate side (7.1) of the membrane to form the hydrogen rich permeate stream (8) with the remaining components in the carbon dioxide lean non-condensable stream (5) forming the hydrogen lean residue stream (9) on the residue side (7.2) of the membrane.

6. The process of claim 5, wherein the carbon dioxide selective membrane separation unit (10) includes one or more carbon dioxide selective membranes, each membrane having a permeate side (10.1) and a residue side (10.2) and allowing for the passing of carbon dioxide to the permeate side (10.1) of the membrane to form a carbon dioxide enriched permeate stream (11) with the remaining components in the hydrogen lean residue stream (9) forming a carbon dioxide depleted residue stream (12) on the residue side (10.2) of the membrane.

7. The process of claim 6, wherein the one or more hydrogen selective membranes are polymeric membranes selected from one or more polyamides, polyaramides, polybenzimidazoles, polybenzimidazole blends with polyimides, polyamides/imides and the one or more carbon dioxide selective membranes are polymeric membranes selected from one or more polyimides, polyetherimides polysulfone, polyethersulfones, polyarylsulfone, polycarbonate, tetrabromo-bisphenol A polycarbonate, tetrachloro-bisphenol A polycarbonate, polydimethylsiloxane, natural rubber, cellulose acetate, cellulose triacetate, ethyl cellulose, PDD-TFE and polytriazole.

8. The process of claim 7, wherein the one or more hydrogen selective membranes and the one or more carbon dioxide selective membranes are both either fabricated into hollow fibers or fabricated into flat sheets.

9. The process of claim 7, wherein the one or more hydrogen selective membranes are different in type form from the one or more carbon dioxide selective membranes.

10. The process of claim 7, wherein the one or more hydrogen selective membranes and the one or more carbon dioxide selective membranes are each made of the same polymers.

11. The process of claim 7, wherein the one or more hydrogen selective membranes and the one or more carbon dioxide selective membranes are each made of different polymers.

12. The process of claim 2, wherein the process stream (1) is compressed to a pressure above 35 bar, the compression occurring either 1) in the compressor (2) prior to step b), 2) in a second compressor that is part of the carbon dioxide separation unit (4), the compression occurring just prior to the separation and purification of step c), or 3) partially in the compressor (2) prior to step b) and then the remaining compression in the second compressor that is a part of the carbon dioxide separation unit (4) to reach a pressure level of 35 bar or greater.

13. The process of claim 12, wherein the carbon dioxide lean non-condensable stream (5) from the carbon dioxide separation unit (4) is heated to a temperature from 50° C. to 150° C. before being fed to the hydrogen selective membrane separation unit (7).

14. The process of claim 4, wherein in step b) the process stream is cooled to a temperature equal to or less than −30° C.

15. The process of claim 1, wherein the carbon dioxide rich liquid stream (6) that is withdrawn is vaporized to produce a carbon dioxide rich gas stream.

16. The process of claim 1, wherein the hydrogen lean residue stream (9) is cooled to a temperature from −60° C. to 50° C. before being fed to the carbon dioxide selective membrane separation unit (10).

17. The process of claim 1, wherein at least 50% of the carbon dioxide in the process stream (1) is recovered.

18. A process for producing hydrogen and capturing carbon dioxide from a hydrocarbon containing feed stream (16) in a hydrogen generation plant, the process comprising the steps of:
   a) optionally pre-reforming the hydrocarbon containing feed stream (16) in at least one pre-reformer (17) to form a pre-reformed gas stream (18);
   b) reforming the pre-reformed gas stream (18) in a steam methane reformer unit (19) to obtain a syngas stream (20);
   c) subjecting the syngas stream (20) to a shift reaction in a water gas shift reactor (21) to obtain a feed gas (15);

d) subjecting the feed gas (15) to hydrogen purification in a process unit (0) to obtain a hydrogen product stream (23) and a hydrogen depleted process stream (1);

e) withdrawing the hydrogen product stream (23) and using a portion of this hydrogen product stream (23) as a fuel for the steam methane reformer unit (19);

f) optionally compressing the process stream (1) in a first compressor (2);

g) cooling the process stream (1) in a heat exchanger (3) to a temperature equal to or less than −10° C.;

h) separating and purifying the cooled process stream (1) in a carbon dioxide separation unit (4) to produce a carbon dioxide rich liquid stream (6) and a carbon dioxide lean non-condensable stream (5);

i) withdrawing the carbon dioxide rich liquid stream (6) as a carbon dioxide product for further use;

j) withdrawing the carbon dioxide lean non-condensable stream (5) from the carbon dioxide separation unit (4) and passing the carbon dioxide lean non-condensable stream (5) through a hydrogen selective membrane separation unit (7) to form a hydrogen rich permeate stream (8) with the remaining components in the carbon dioxide lean non-condensable stream (5) forming a hydrogen lean residue stream (9);

k) passing the hydrogen lean residue stream (9) through a carbon dioxide selective membrane separation unit (10) to form a carbon dioxide enriched permeate stream (11) with the remaining components in the hydrogen lean residue stream (9) forming a carbon dioxide depleted residue stream (12); and l) optionally compressing the hydrogen rich permeate stream (8) in a second compressor (13) and recycling the hydrogen rich permeate stream (8) for use as a supplemental feed stream in the steam methane reformer (19), the water gas shift reactor (21) or the process unit (0) or as a fuel for the steam methane reformer (19), recycling the carbon dioxide enriched permeate stream (11) to the process stream (1) prior to the compressor (2) or within the compressor (2) between stages of compression or optionally compressing the carbon dioxide enriched permeate stream (11) and recycling the carbon dioxide enriched permeate stream (11) to be used in the carbon dioxide separation unit (4) and recycling the carbon dioxide depleted residue stream (12) to be used as a supplemental feed stream for the pre-reformer (17) or the steam methane reformer (19) or as both a fuel and a feed stream in the present process or in other processes.

19. The process of claim 18, wherein the carbon dioxide depleted residue stream (12) is passed through a turbo expander (22) to recover compressed gas energy prior to being used as a supplemental feed stream for the pre-reformer (17) or the steam methane reformer (19) or as both a fuel and a feed stream in the present process or in other processes.

20. The process of claim 19, wherein the pre-reforming is performed with the supply of heat.

21. The process of claim 20, wherein the pre-reforming is performed in two or more adiabatic steps with heat supply between the two or more steps.

22. The process of claim 18, wherein the overall capture rate of carbon dioxide from the hydrogen production process is equal to or greater than 90%.

23. The process of claim 22, wherein the process unit (0) is a pressure swing adsorption unit and the process stream (1) is a tail gas from the pressure swing adsorption unit.

24. The process of claim 22, wherein the separation and purification of the cooled process stream in the carbon dioxide separation unit (4) is carried out by single or multi-step partial liquefaction, compression and distillation or any combination of single or multi-step partial liquefaction, compression and distillation.

25. The process of claim 24, wherein the hydrogen selective membrane separation unit (7) includes one or more hydrogen selective membranes, each membrane having a permeate side (7.1) and a residue side (7.2) and allowing for the passing of hydrogen to the permeate side (7.1) of the membrane to form the hydrogen rich permeate stream (8) with the remaining components in the carbon dioxide lean non-condensable stream (5) forming the hydrogen lean residue stream (9) on the residue side (7.2) of the membrane.

26. The process of claim 25, wherein the carbon dioxide selective membrane separation unit (10) includes one or more carbon dioxide selective membranes, each membrane having a permeate side (10.1) and a residue side (10.2) and allowing for the passing of carbon dioxide to the permeate side (10.1) of the membrane to form a carbon dioxide enriched permeate stream (11) with the remaining components in the hydrogen lean residue stream (9) forming a carbon dioxide depleted residue stream (12) on the residue side (10.2) of the membrane.

27. The process of claim 26, wherein the one or more hydrogen selective membranes are polymeric membranes selected from one or more polyamides, polyaramides, polybenzimidazoles, polybenzimidazole blends with polyimides, polyamides/imides and the one or more carbon dioxide selective membranes are polymeric membranes selected from selected from one or more polyimides, polyetherimides polysulfone, polyethersulfones, polyarylsulfone, polycarbonate, tetrabromo-bisphenol A polycarbonate, tetrachloro-bisphenol A polycarbonate, polydimethylsiloxane, natural rubber, cellulose actetate, cellulose triacetate, ethyl cellulose, PDD-TFE and polytriazole.

28. The process of claim 27 wherein the one or more hydrogen selective membranes and the one or more carbon dioxide selective membranes are each membranes of the fiber type.

29. The process of claim 27, wherein the one or more hydrogen selective membranes are different in type from the one or more carbon dioxide selective membranes.

30. The process of claim 24, wherein in step b) the process stream (1) is cooled to a temperature equal to or less than −30° C.

31. The process of claim 23, wherein the process stream (1) is compressed to a pressure above 35 bar, the compression occurring either 1) in the compressor (2) prior to step b), in a second compressor that is part of the carbon dioxide separation unit (4), the compression occurring just prior to the separation and purification of step c), or 3) partially in the compressor (2) prior to step b) and then the remaining compression in the second compressor that is a part of the carbon dioxide separation unit (4) to reach a pressure level that is equal to or greater than 35 bar.

32. The process of claim 31, wherein the carbon dioxide lean non-condensable stream (5) from the carbon dioxide separation unit (4) is heated to a temperature from 50° C. to 150° C. before being fed to the hydrogen selective membrane separation unit (7).

33. The process of claim 32, wherein the heat brought to the carbon dioxide lean non-condensable stream (5) is taken from the process stream (1) after the step of compression.

34. The process of claim 23, wherein the carbon dioxide rich liquid stream (6) that is withdrawn is vaporized to produce a carbon dioxide rich gas stream.

35. The process of claim 23, wherein the hydrogen lean residue stream (9) is cooled to a temperature from −60° C. to 50° C. before being fed to the carbon dioxide selective membrane separation unit (10).

36. The process of claim 35, wherein the carbon dioxide selective membranes are cold membranes that operate between −55° C. and 30° C.

37. The process of claim 18, wherein the overall capture rate of carbon dioxide from the hydrogen production process is equal to or greater than 99%.

38. The process of claim 18, wherein the overall capture rate of carbon dioxide from the hydrogen production process approaches or achieves 100%.

* * * * *